United States Patent
Nishigaki et al.

(10) Patent No.: US 11,512,949 B2
(45) Date of Patent: Nov. 29, 2022

(54) SCREW LENGTH DETERMINATION SYSTEM, SCREW-TIGHTENING SYSTEM AND STORAGE MEDIUM

(71) Applicant: OMRON Corporation, Kyoto (JP)

(72) Inventors: Koji Nishigaki, Kusatsu (JP); Tatsuya Sasaki, Otsu (JP); Takanori Shibutani, Otsu (JP)

(73) Assignee: OMRON Corporation, Kyoto (JP)

( * ) Notice: Subject to any disclaimer, the term of this patent is extended or adjusted under 35 U.S.C. 154(b) by 49 days.

(21) Appl. No.: 17/278,667

(22) PCT Filed: Sep. 25, 2019

(86) PCT No.: PCT/JP2019/037509
§ 371 (c)(1),
(2) Date: Mar. 23, 2021

(87) PCT Pub. No.: WO2020/090292
PCT Pub. Date: May 7, 2020

(65) Prior Publication Data
US 2022/0042796 A1 Feb. 10, 2022

(30) Foreign Application Priority Data
Oct. 29, 2018 (JP) .............................. JP2018-203047

(51) Int. Cl.
*G01B 21/06* (2006.01)
*B23P 19/06* (2006.01)

(52) U.S. Cl.
CPC .............. *G01B 21/06* (2013.01); *B23P 19/06* (2013.01)

(58) Field of Classification Search
CPC ....... B23P 19/06; G01B 11/02; G01B 11/022; G01B 11/026; G01B 11/04; G01B 11/043
See application file for complete search history.

(56) References Cited

U.S. PATENT DOCUMENTS 3,650,397 A * 3/1972 Bornemeier .............. B07C 5/10
356/394
4,063,820 A * 12/1977 Borgese ................. G01B 11/00
356/625

(Continued)

FOREIGN PATENT DOCUMENTS

DE 102012108476 A1 * 3/2013 ............. B23P 19/06
JP H0263932 5/1990
(Continued)

OTHER PUBLICATIONS

"International Search Report (Form PCT/ISA/210) of PCT/JP2019/037509," dated Dec. 3, 2019, with English translation thereof, pp. 1-4.
(Continued)

*Primary Examiner* — Jason L Vaughan
(74) *Attorney, Agent, or Firm* — JCIPRNET (57) ABSTRACT

A screw length determination system capable of quickly determining the length of a screw is obtained. A PLC (10) is equipped with a determination part for measuring the moving speed of a driver for tightening screws in the axial direction of the driver from an initial position until a screw contacts and is screwed into a workpiece, and determining the length of the screw on the basis of the time from the start of movement from the initial position until the moving speed changes.

4 Claims, 4 Drawing Sheets

(56) References Cited

U.S. PATENT DOCUMENTS

| | | | | |
|---|---|---|---|---|
| 4,457,622 A * | 7/1984 | Kato | ............ | B07C 5/10 250/559.39 |
| 4,823,396 A * | 4/1989 | Thompson | ............ | B07C 5/10 348/130 |
| 4,828,159 A * | 5/1989 | Woods | ............ | B21J 15/28 227/112 |
| 5,042,015 A * | 8/1991 | Stringer | ............ | G01B 11/04 702/156 |
| 5,105,392 A * | 4/1992 | Stringer | ............ | G01B 11/04 702/156 |
| 5,296,914 A * | 3/1994 | Aldred | ............ | G01B 11/02 250/559.12 |
| 5,383,021 A * | 1/1995 | Hanna | ............ | G01B 11/245 356/634 |
| 5,636,028 A * | 6/1997 | Stringer | ............ | G01B 11/00 356/627 |
| 5,673,839 A * | 10/1997 | Howard | ............ | G01B 7/26 227/51 |
| 5,727,300 A * | 3/1998 | Ekdahl | ............ | B21J 15/28 29/702 |
| 5,823,356 A * | 10/1998 | Goodrich | ............ | B07C 5/10 209/601 |
| 6,111,601 A * | 8/2000 | Adachi | ............ | G01B 11/2433 348/137 |
| 7,245,759 B2 * | 7/2007 | Jones, Jr. | ............ | G01N 21/9515 382/152 |
| 2007/0079491 A1* | 4/2007 | Hader | ............ | B21J 15/28 29/524.1 |

FOREIGN PATENT DOCUMENTS

| | | | | |
|---|---|---|---|---|
| JP | H07164261 | | 6/1995 | |
| JP | H07280677 | | 10/1995 | |
| JP | 2004090199 | | 3/2004 | |
| JP | 2012223841 | | 11/2012 | |
| JP | 2012223841 A | * | 11/2012 | ............ B23P 19/06 |
| KR | 20160054200 | | 5/2016 | |

OTHER PUBLICATIONS

"Written Opinion of the International Searching Authority (Form PCT/ISA/237) of PCT/JP2019/037509," dated Dec. 3, 2019, with English translation thereof, pp. 1-6.

"Search Report of Europe Counterpart Application", dated Jun. 14, 2022, p. 1-p. 8.

* cited by examiner

| Time | t1 or more and t2 or less | t3 or more and t4 or less |
|---|---|---|
| Length of screw | L10 | L08 |

SCREW LENGTH DETERMINATION SYSTEM, SCREW-TIGHTENING SYSTEM AND STORAGE MEDIUM

CROSS-REFERENCE TO RELATED APPLICATION

This application is a 371 application of the International PCT application serial no. PCT/JP2019/037509, filed on Sep. 25, 2019, which claims the priority benefits of Japan Patent Application No. 2018-203047, filed on Oct. 29, 2018. The entirety of each of the above-mentioned patent applications is hereby incorporated by reference herein and made a part of this specification.

BACKGROUND

Technical Field

The present invention relates to a screw length determination system that determines a length of a screw in a screw tightening process, a screw-tightening system including the screw length determination system, and a program.

Related Art

Patent Literature 1 discloses a bolt tightening abnormality detection method and the like. In this method, a seat part of a bolt is tightened twice in succession until it is seated on a fastening target, and a timer measures a time required from a rotation start time of a motor or socket to the seating of the bolt in a second tightening operation. A length of the bolt is determined by comparing this time with a standard time when a controller uses a proper bolt.

CITATION LIST

Patent Literature

[Patent Literature 1]
Japanese Patent Application Laid-Open No. H07-164261 (laid-open on Jun. 27, 1995)

SUMMARY

Technical Problem

However, with the method described in Patent Literature 1, the length of a bolt can be determined only after the bolt tightening operation is completed.

An objective of one aspect of the present invention is to realize a screw length determination system or the like capable of determining a length of a screw at an early stage.

Solution to Problem

In order to solve the above problems, a screw length determination system according to one aspect of the present invention includes: a speed measurement part which measures a moving speed of a driver in an axial direction from a predetermined position before a screw comes into contact with a fastening target until the screw comes into contact with and is screwed to the fastening target, in a case in which the driver performing a rotational movement around an axis and a reciprocating movement in the axial direction in accordance with motor control mounts the screw to the fastening target; and a length determination part which determines a length of the screw on the basis of a time from a movement start of the driver from the predetermined position until the moving speed measured by the speed measurement part changes before and after contact of the screw with the fastening target.

Effects

According to the screw length determination system according to one aspect of the present invention, a length of a screw can be determined at an early stage.

BRIEF DESCRIPTION OF THE DRAWINGS

In FIG. 4, (a) is a graph showing a relationship of an axial position of a driver with respect to time in a case in which two types of screws that are different only in length are tightened a plurality of times, and (b) is an enlarged view of a region R in the graph shown in (a).

DESCRIPTION OF THE EMBODIMENTS

Hereinafter, an embodiment according to one aspect of the present invention (hereinafter, also referred to as "the present embodiment") will be described with reference to the drawings.

§ 1 Application Example

Figure 1:
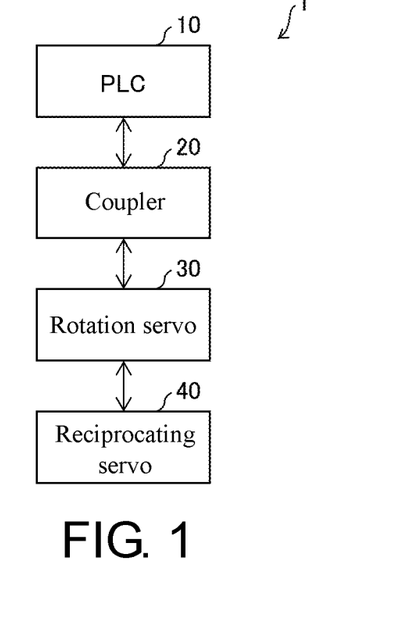
FIG. 1 is a block diagram showing an outline of a screw-tightening system according to the present embodiment.

FIG. 1 is a block diagram showing an outline of a screw-tightening system 1 according to the present embodiment. As shown in FIG. 1, the screw-tightening system 1 includes a programmable logic controller (PLC) 10 (a screw length determination system), a coupler 20, a rotation servo 30, and a reciprocating servo 40 (an axial position detection part). The screw-tightening system 1 performs a screw tightening operation using a rotational movement of a driver 51 (see FIG. 2), which will be described later, around an axis thereof and a reciprocating movement of the driver 51 in an axial direction thereof. In this case, the PLC 10 performs control of the screw tightening operation and determines whether or not a length of a screw is correct.

In a case in which the length of the screw is not appropriate, a screw tightening failure such as bottoming (the screw tightening operation stops halfway because the screw is longer than a screw hole or foreign matters have accumulated in the screw hole) or a case in which the length of the screw screwed into the screw hole are short will occur. The screw tightening failure means a state in which a screw does not exert a sufficient fastening force even though a standard torque is applied to the screw. The PLC 10 inhibits occurrence of the above-mentioned screw tightening failure by determining the length of the screw.

The rotation servo 30 is a motor that causes the rotational movement of the driver 51 around the axis. Further, the rotation servo 30 outputs its own rotation speed (deg./s), an amount of rotation (deg.), and a rotation torque (a ratio thereof to a rated torque (%)) to the coupler 20.

The reciprocating servo 40 is a motor that causes the driver 51 to reciprocate in the axial direction. Further, the reciprocating servo 40 outputs a moving speed (mm/s), a moving position (mm), and a moving torque (a ratio (%) thereof to a rated torque) of the driver 51 due to its own rotation to the coupler 20. For this reason, the reciprocating servo 40 also functions as an axial position detection part that detects a position of the driver 51 in the axial direction.

The coupler 20 connects the PLC 10 to the rotation servo 30 and the reciprocating servo 40. Specifically, the coupler 20 transmits a control signal received from the PLC 10 to the rotation servo 30 and the reciprocating servo 40. Further, the coupler 20 transmits the rotation speed, the amount of rotation, and the rotation torque of the rotation servo 30 received from the rotation servo 30 to the PLC 10. Also, the coupler 20 transmits the moving speed, the moving position, and the moving torque of the driver 51 due to the rotation of the reciprocating servo 40 received from the reciprocating servo 40 to the PLC 10.

In the following description, the rotation speed, the amount of rotation, and the rotation torque of the rotation servo 30, and the moving speed, the moving position, and the movement torque of the driver 51 due to the rotation of the reciprocating servo 40 may be collectively referred to as parameters.

Figure 2:
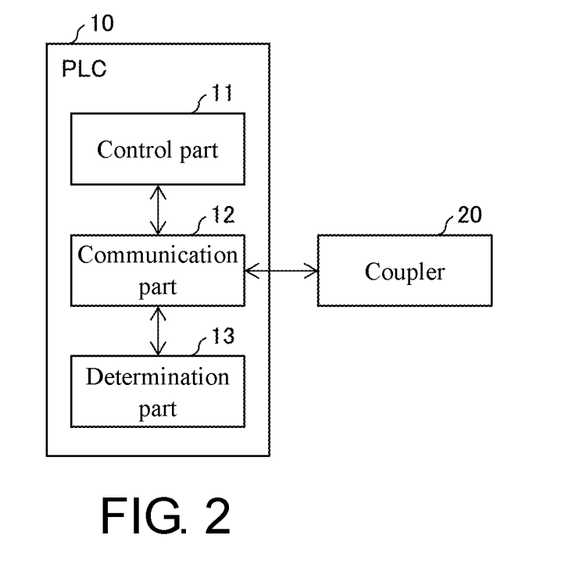
FIG. 2 is a block diagram showing a configuration of a PLC.

FIG. 2 is a block diagram showing a configuration of the PLC 10. The PLC 10 controls an operation of the screw-tightening system 1. As shown in FIG. 2, the PLC 10 includes a control part 11, a communication part 12, and a determination part 13 (a speed measurement part and a length determination part).

The control part 11 outputs a control signal for controlling the rotation servo 30 and the reciprocating servo 40 to the communication part 12. The communication part 12 transmits the control signal input from the control part 11 to the coupler 20. The control signal is transmitted to the rotation servo 30 and the reciprocating servo 40 via the coupler 20 to control the rotation servo 30 and the reciprocating servo 40. The control part 11 controls the rotation servo 30 and the reciprocating servo 40 in synchronization with each other. Further, the control part 11 feeds back the parameters of the rotation servo 30 and the reciprocating servo 40 to the control of the rotation servo 30 and the reciprocating servo 40.

The communication part 12 receives the parameters from the rotation servo 30 and the reciprocating servo 40 via the coupler 20. The communication part 12 stores the received parameters in a storage device (not shown). Further, the screw-tightening system 1 may include a storage device for storing the received parameters. The control part 11 and the determination part 13 acquire the parameters from the storage device as needed. Also, for the sake of simplicity, in FIG. 2, the communication part 12 outputs the parameters to the control part 11 and the determination part 13.

The determination part 13 measures a moving speed of the driver 51 in the axial direction from a predetermined position before the screw comes into contact with the fastening target until the screw comes into contact with and is screwed to the fastening target in a case in which the driver 51 mounts the screw to the fastening target. Further, the determination part 13 determines the length of the screw on the basis of a time from a movement start of the driver 51 from the predetermined position until the moving speed changes before and after the screw comes into contact with the fastening target. For this reason, the determination part 13 can determine the length of the screw when the moving speed of the driver 51 changes. Therefore, the PLC 10 can determine the length of the screw at an early stage as compared with the determination method disclosed in Patent Literature 1, for example. A specific example of the determination performed by the determination part 13 will be described later.

§ 2 Configuration Example (Configuration of Screw-Tightening System 1)

Figure 3:
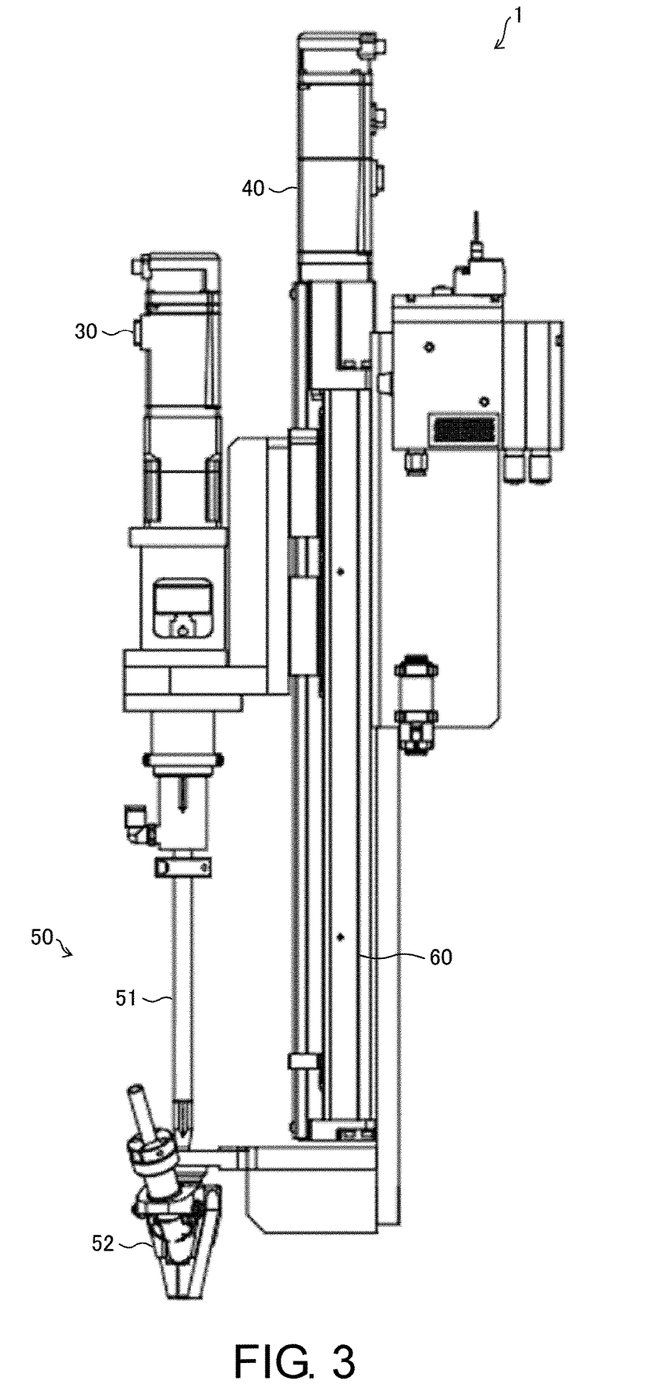
FIG. 3 is a diagram showing an example of an outer shape of the screw-tightening system according to the present embodiment.

FIG. 3 is a diagram showing an example of an outer shape of the screw-tightening system 1 according to the present embodiment. As shown in FIG. 3, the screw-tightening system 1 includes the rotation servo 30, the reciprocating servo 40, a driver unit 50, and a support column 60. Further, although not shown in FIG. 3, the screw-tightening system 1 also includes the PLC 10 and the coupler 20 as described above.

The driver unit 50 is a unit for performing screw tightening. The driver unit 50 includes a driver 51 and a screw holding part 52. The driver 51 performs a screw tightening operation by performing the rotational movement around the axis and the reciprocating movement in the axial direction in accordance with motor control performed by the rotation servo 30 and the reciprocating servo 40. In the following description, among axial directions of the driver 51, a direction in which the driver 51 moves in the process of screw tightening is referred to as a downward direction.

The rotation servo 30 is disposed above the driver 51 and causes the rotational movement of the driver 51 around the axis. Further, the screw holding part 52 is provided below the driver 51 and holds a screw that is a target for screw tightening performed by the driver 51.

The support column 60 supports the driver unit 50 to be movable up and down. The reciprocating servo 40 is provided on an upper part of the support column 60 and is connected to the driver unit 50 via a ball screw (not shown). A rotational movement of the reciprocating servo 40 is converted into a linear movement in a vertical direction caused by the ball screw. As a result, the driver unit 50 reciprocates up and down.

(Screw Tightening Operation)

The screw tightening operation performed by the screw-tightening system 1 is as follows. First, the screw holding part 52 being in a state of holding a screw lowers the screw to a place, at which screw tightening is performed, of a workpiece (fastening target) (not shown) that is a target for performing the screw tightening. Next, the driver 51 presses the screw against the place at which the screw tightening is performed while rotating the screw until the screw is provisionally seated. Here, the provisional seating indicates a state in which a seating surface of the screw is in contact with the workpiece. In the present embodiment, a state in which the rotation torque of the rotation servo 30 reaches 50% is defined as a state in which the screw is provisionally seated.

The screw-tightening system 1 performs primary tightening by pressing the screw against the workpiece while rotating the screw from the state in which the screw is provisionally seated. In the present embodiment, the primary tightening is performed until the rotation torque of the rotation servo 30 reaches 150% (a first predetermined value). When the rotation torque reaches 150%, the screw-tightening system 1 stops pressing the screw against the workpiece and holds the rotation torque at 150% or more for 100 ms.

Then, the rotation torque of the rotation servo 30 is caused to be 0% or less to release the screw. Further, by moving the driver 51 upward and returning it to an original position, the screw tightening operation is completed. However, the rotation torque and the holding time described above are examples and differ depending on types of screws and types of fasteners and fastening targets.

Further, in the example of the screw tightening operation described above, the screw tightening is performed for the workpiece in a state in which a female screw is cut (tapped) in advance at the place at which the screw tightening is performed. However, the screw-tightening system 1 can also perform the screw tightening on the workpiece in a state in which a female screw is not cut at the place at which the screw tightening is performed (tapping (self-tap)).

In a case in which the screw tightening is performed on the workpiece for tapping, the rotation torque of the rotation servo 30 reaches 50% or more even when the screw is not provisionally seated. Therefore, in a case in which the screw tightening is performed on the workpiece for tapping, the determination part 13 determines a state in which the rotation torque of the rotation servo 30 reaches 100% as the state in which the screw is provisionally seated. However, the determination part 13 may set the rotation torque of the rotation servo 30 in which the screw is provisionally seated in the case in which the screw tightening is performed on the workpiece for tapping to another value.

§ 3 Operation Example

The determination of the length of the screw performed by the determination part 13 will be described below.

Figure 4:
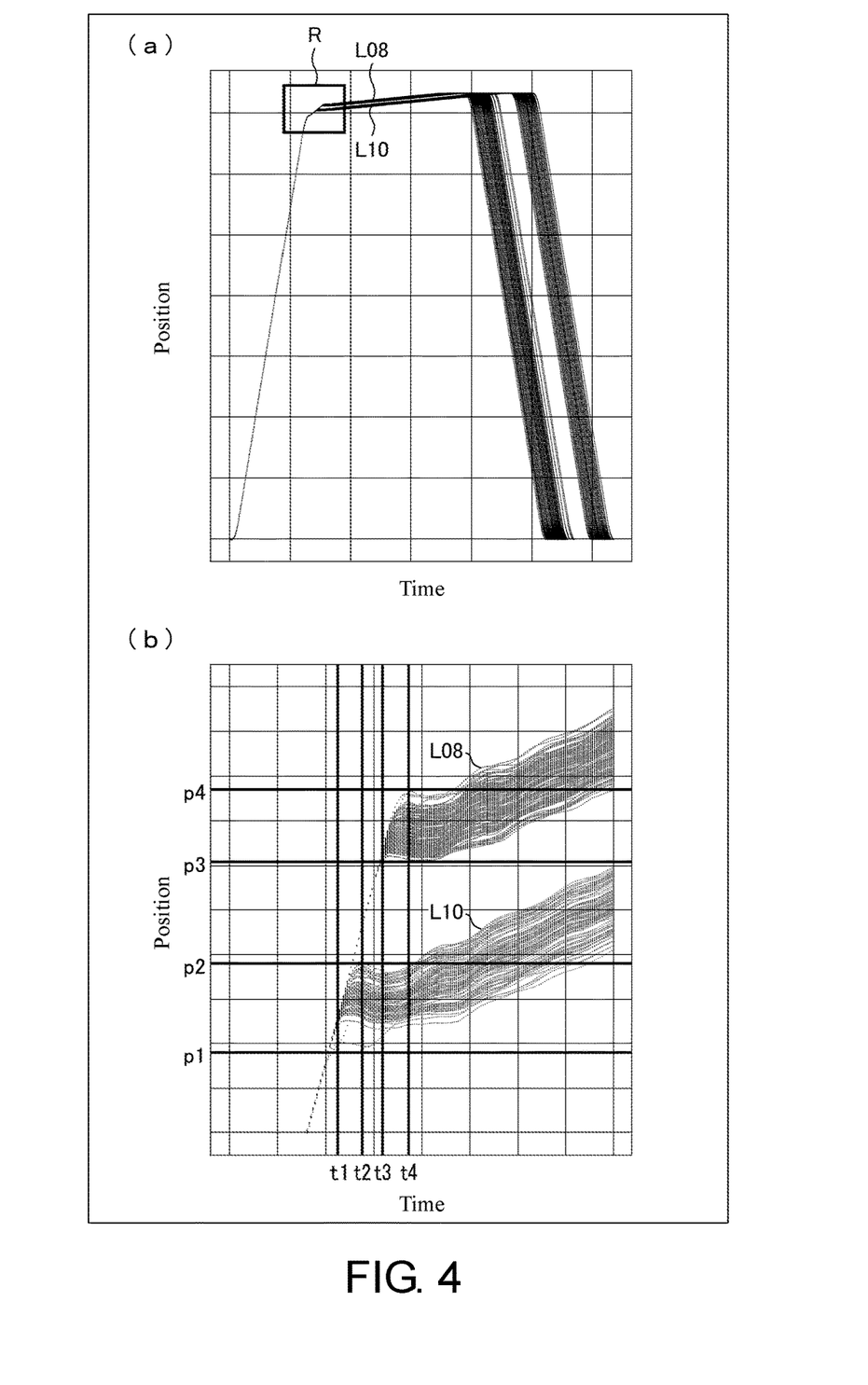

In FIG. 4, (a) is a graph showing a relationship of an axial position of the driver 51 with respect to time in a case in which two types of screws that differ only in length are tightened a plurality of times. In FIG. 4, (b) is an enlarged view of a region R in the graph shown in (a) of FIG. 4. In (a) and (b) of FIG. 4, the horizontal axis represents time and the vertical axis represents the axial position of the driver 51. Further, in (a) and (b) of FIG. 4, an inclination of the graph indicates the moving speed of the driver 51 in the axial direction.

Further, in the screw-tightening system 1, the PLC 10 lowers the driver 51 at a high speed for a certain period of time from a descent start of the driver 51 and controls the reciprocating servo 40 to lower the driver 51 at a low speed after a lapse of the certain period of time. As a result, the PLC 10 prevents the screw and the workpiece from colliding with each other at a high speed.

In (a) and (b) of FIG. 4, a length of a short screw is shown as L08, and a length of a long screw is shown as L10. As shown in (a) and (b) of FIG. 4, the relationship of the position with respect to time in the screw tightening tends to clearly differ depending on the length of the screw.

Specifically, as shown in (b) of FIG. 4, in a case in which screw tightening of a screw having a length of L10 is performed, the moving speed of the driver 51 changes at a position within the range from positions p1 to p2 during the period from time t1 to t2. On the other hand, in a case in which screw tightening of a screw having a length of L08 is performed, the moving speed of the driver 51 changes at a position within the range from positions p3 to p4 during the period from time t3 to t4.

The region R is a region corresponding to the vicinity of the time when the tip of the screw comes into contact with the workpiece. For this reason, the moving speed of the driver 51 in the screw tightening operation is greatly reduced in the region R shown in (a) of FIG. 4. Here, in a case in which the position of the driver 51 in the axial direction at the start time of the screw tightening operation is constant, the time between the start time of the screw tightening operation and the time when the tip of the screw comes into contact with the workpiece depends on the length of the screw. For this reason, as shown in (b) of FIG. 4, the time until the moving speed of the driver 51 changes depends on the length of the screw.

A predetermined position at which the determination part 13 starts measuring the moving speed of the driver 51 may be an initial position of the driver 51. Further, in the example shown in (a) of FIG. 4, a two-step change is shown in which the moving speed of the driver 51 is slowed down by one step at a position moved a certain distance from the initial position, and then slowed down by the other step before and after the tip of the screw comes into contact with the fastening target. In such a case, the predetermined position at which the determination part 13 starts measuring the moving speed of the driver 51 may be a position at which the moving speed of the driver 51 becomes slower in the first step.

Figure 5:
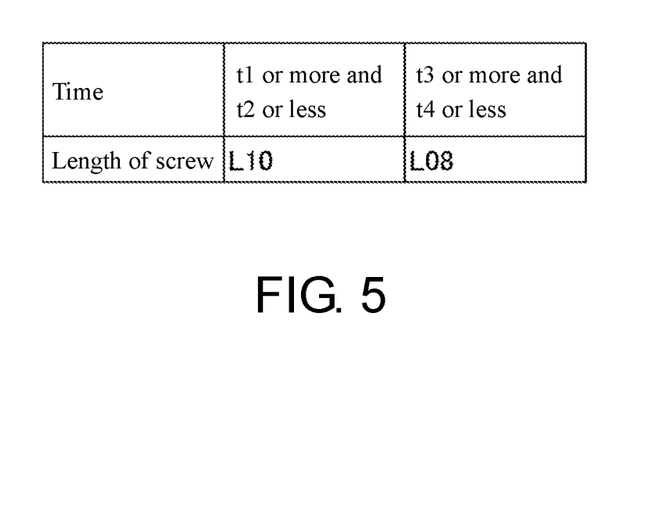
FIG. 5 is a diagram showing an example of a table referred to by a determination part.

FIG. 5 is a diagram showing an example of a table referred to by the determination part 13. In the present embodiment, the determination part 13 determines the length of the screw with reference to the table showing a relationship between the length of the screw and a range of the time at which the moving speed of the driver 51 changes. In FIG. 5, it is defined that, in a case in which a time when the moving speed of the driver 51 changes is t1 or more and t2 or less, the length of the screw is determined to be L10, and in a case in which the above time is t3 or more and t4 or less, the length of the screw is determined to be L08. By referring to the table shown in FIG. 5, the determination part 13 can determine that the length of the screw is L10 even if the time when the moving speed of the driver 51 changes is within the range of t1 or more and t2 or less. Similarly, the determination part 13 can determine that the length of the screw is L08 even if the time when the moving speed of the driver 51 changes is within the range of t3 or more and t4 or less. Therefore, by referring to the table, the determination part 13 can absorb the variation and determine the length of the screw even if the distance from the initial position of the screw to the fastening target varies.

The above table may be stored in a storage device (not shown) connected to the PLC 10 via, for example, the coupler 20. However, the determination part 13 may calculate the length of the screw on the basis of a moving distance until the moving speed of the driver 51 changes.

Further, the determination part 13 may determine suitability of the length of the screw by statistically analyzing the time during which the moving speed of the driver 51 changes. For example, the determination part 13 may calculate an average and a standard deviation $\sigma$ for statistical data of the time when the moving speed of the driver 51 changes and determine that a length of the screw whose difference between the time when the moving speed of the driver 51 changes and the average is 3 times the standard deviation $\sigma$ or more is not appropriate.

Figure 6:
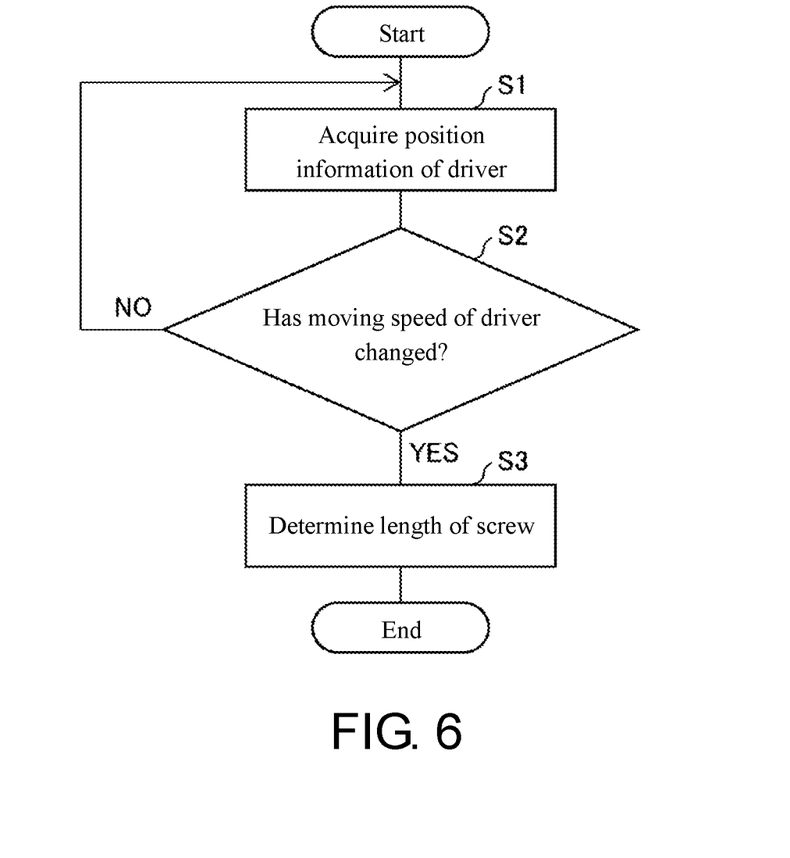
FIG. 6 is a flowchart showing an example of processing performed by the determination part.

FIG. 6 is a flowchart showing an example of processing performed by the determination part 13. In the determination, the determination part 13 first acquires position information of the driver 51 from the reciprocating servo 40 (S1).

Next, the determination part 13 determines whether or not the moving speed of the driver 51 has changed (S2). If the moving speed of the driver 51 has not changed (NO in S2), the determination part 13 repeats the process from S1 again.

On the other hand, in a case in which the moving speed of the driver 51 changes, the determination part 13 determines the length of the screw with reference to the table as described above (S3). Then, the determination part 13 ends the process.

Further, in step S2, for example, in a case in which the moving speed of the driver 51 calculated from an arbitrary number of pieces of position information continuously acquired up to step S1 executed immediately before falls below a predetermined speed, the determination part 13 may determine that the moving speed has changed. Alternatively, in a case in which the moving speed calculated by the above method is reduced to a predetermined proportion or less with respect to the moving speed calculated using the position information before the position information used for calculating the moving speed, the determination part 13 may determine that the moving speed has changed.

Also, the PLC 10 may further include a notification part that notifies of the length of the screw determined by the determination part 13 in step S3. For example, in a case in which the length of the screw determined by the determination part 13 is different from an appropriate length, the notification part may notify a user of the screw-tightening system 1 of that fact using voice, light, an image, or the like. In this case, the screw-tightening system 1 may include a speaker, a light emitting device, an image display device, or the like for the notification part to perform notification.

Also, the screw-tightening system 1 may have a configuration different from that of the reciprocating servo 40 as an axial position detection part for acquiring position information of the driver 51 in the axial direction. An example of another configuration is an optical sensor or the like. In the case of another configuration, the determination part 13 may acquire the position information of the driver 51 in the axial direction from the other configuration in step S1.

Further, in the example described above, the determination part 13 performs both measurement of the moving speed of the driver 51 and calculation of the length of the screw, but these may be executed by different processing parts.

Further, in the example described above, the PLC 10 performs both control of the screw tightening operation and determination of the length of the screw, but a PLC that performs the above control and a PLC that performs the above determination may be provided separately. For example, one controller for screw length determination may receive measurement data from a plurality of PLCs for controlling screw tightening and determine the length of the screw. That is, in this case, the screw length determination system is configured of a screw length determination controller and a PLC for controlling screw tightening.

§ 4 Modified Example

The control block (particularly the control part 11, the communication part 12, and the determination part 13) of the screw-tightening system 1 may be realized using a logic circuit (hardware) formed in an integrated circuit (IC chip) or the like, or may be realized using software.

In the latter case, the screw-tightening system 1 includes a computer for executing commands of a program that is software for realizing each function. This computer includes, for example, one or more processors and a computer-readable recording medium that stores the program. In addition, in the computer, the processor reads the program from the recording medium and executes it, thereby achieving the objective of the present invention. As the processor, for example, a central processing unit (CPU) can be used. As the recording medium, a "non-transitory tangible medium," for example, a tape, a disk, a card, a semiconductor memory, a programmable logic circuit or the like in addition to a read only memory (ROM) or the like can be used. Further, a random access memory (RAM) for loading the above program may be further provided. Also, the program may be supplied to the computer via an arbitrary transmission medium (a communication network, broadcasting waves, etc.) capable of transmitting the program. In addition, one aspect of the present invention can also be realized in the form of a data signal embedded in a carrier wave, in which the above program is embodied by electronic transmission.

The present invention is not limited to the embodiments described above, and various modifications can be made within the scope of the claims, and the embodiments obtained by appropriately combining the technical means disclosed in the different embodiments are also included in the technical scope of the present invention.

(Summary)

As described above, the screw length determination system according to one aspect of the present invention includes: the speed measurement part which measures the moving speed of the driver in the axial direction from the predetermined position before the screw comes into contact with the fastening target until the screw comes into contact with and is screwed to the fastening target, in the case in which the driver performing the rotational movement around the axis and the reciprocating movement in the axial direction in accordance with motor control mounts the screw to the fastening target; and the length determination part which determines the length of the screw on the basis of the time from the movement start of the driver from the predetermined position until the moving speed measured by the speed measurement part changes before and after contact of the screw with the fastening target.

According to the above configuration, the length determination part determines the length of the screw on the basis of the time from the movement start of the driver from the predetermined position until the moving speed measured by the speed measurement part changes before and after contact of the screw with the fastening target. The contact of the screw with the fastening target occurs before the tightening of the screw has been completed. Therefore, the length of the screw can be determined earlier than the tightening of the screw is completed.

Also, in the screw length determination system according to one aspect of the present invention, the length determination part determines the length of the screw with reference to the table showing the relationship between the length of the screw and a range of the time.

In a case in which there is a variation in the distance from the initial position to the fastening target, the time fluctuates to some extent. On the other hand, according to the above configuration, the length determination part can absorb the variation in the distance and determine the length of the screw by referring to the table showing the relationship between the length of the screw and the range of the time.

Also, the screw-tightening system according to one aspect of the present invention includes the rotation servo that causes the rotational movement of the driver around the axis, the reciprocating servo that causes the reciprocating movement of the driver in the axial direction, the axial position detection part that detects the position of the driver in the axial direction, and the screw length determination system according to any of the above aspects.

According to the above configuration, in the case in which the screw-tightening system performs the screw tightening, the screw length determination system can determine the length of the screw at an early stage on the basis of the position of the driver detected by the axial position detection part.

Also, a program according to one aspect of the present invention operates a computer as the screw length determination system according to any one of the above aspects.

What is claimed is:

1. A screw length determination system comprising:
a controller configured to
measure a moving speed of a driver in an axial direction from a predetermined position before a screw comes into contact with a fastening target until the screw comes into contact with and is screwed to the fastening target, in a case in which the driver performing a rotational movement around an axis and a reciprocating movement in the axial direction in accordance with motor control mounts the screw to the fastening target, and
determine a length of the screw on the basis of a time from a movement start of the driver from the predetermined position until the moving speed measured by the controller changes before and after contact of the screw with the fastening target.

2. The screw length determination system according to claim 1, wherein the controller determines the length of the screw with reference to a table showing a relationship between the length of the screw and a range of the time.

3. A screw-tightening system comprising:
a rotation servo that causes a rotational movement of a driver around an axis;
a reciprocating servo that causes a reciprocating movement of the driver in an axial direction;
an optical sensor that detects a position of the driver in the axial direction; and
the screw length determination system according to claim 1.

4. A non-transitory computer readable storage medium, storing a program for operating a computer as the screw length determination system according to claim 1.

* * * * *